United States Patent [19]

Pavlick

[11] Patent Number: 4,964,324
[45] Date of Patent: Oct. 23, 1990

[54] SIDE TRIMMER SHEAR

[75] Inventor: Drew C. Pavlick, Bethel Park, Pa.

[73] Assignee: SMS Engineering, Inc., Pittsburgh, Pa.

[21] Appl. No.: 270,080

[22] Filed: Nov. 14, 1988

[51] Int. Cl.$^5$ .............................................. B26D 1/56
[52] U.S. Cl. ........................................ 83/302; 83/175; 83/425.2; 83/500; 83/508.2; 83/923
[58] Field of Search ................. 83/343, 302, 408, 923, 83/175, 425.2, 430, 495, 496, 508.2, 508.3, 500; 464/158, 159

[56] References Cited

U.S. PATENT DOCUMENTS

| | | | |
|---|---|---|---|
| 1,527,194 | 2/1925 | Kelly | 83/496 |
| 2,014,248 | 9/1935 | Evans | 83/302 |
| 2,133,595 | 10/1938 | Thomas | 83/302 |
| 3,110,208 | 11/1963 | Mitchell, Jr. et al. | 83/302 |
| 3,246,553 | 4/1966 | O'Brien | 83/302 |
| 3,830,127 | 8/1974 | James et al. | 83/425.2 |
| 4,464,141 | 8/1984 | Brown | 464/159 |

*Primary Examiner*—Frank T. Yost
*Assistant Examiner*—Hwei-Siu Payer
*Attorney, Agent, or Firm*—Clifford A. Poff

[57] ABSTRACT

A side trimmer shear for metallic strip and the like travelling along a pass line including gear housings on opposite sides of the strip as it passes along the pass line. Means are provided for varying the angular positions of the gear housings with respect to the pass line. Upper and lower shear knives are carried on the gear housings for engaging and trimming the edges of the strip; while a rigid shaft extends between the gear housings. Gearing is carried within the gear housings for driving the shear knives; while a gear mounted on splines on the drive shaft is provided with gear teeth with curved side walls which permit angular variation of the positions of the gear housings with respect to the rigid drive shaft. The apparatus also includes chopper rolls carried on the gear housings which are driven by a similar rigid drive shaft and a gear provided with curved side walls. Since the gear on the drive shaft is connected to the drive shaft through a splined connected, movement of the gear housings toward or away from each other is facilitated to accommodate varying strip widths.

4 Claims, 3 Drawing Sheets

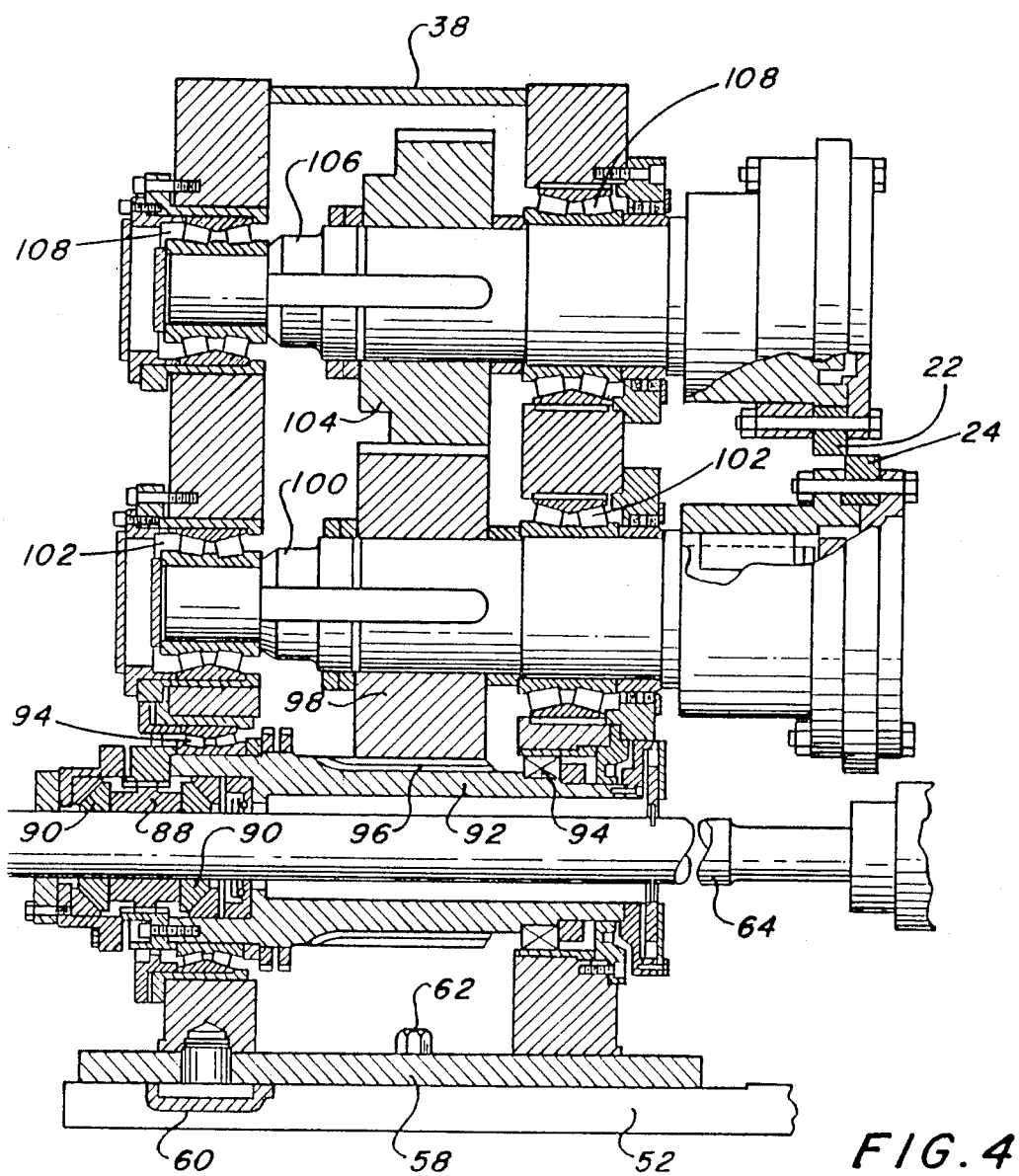
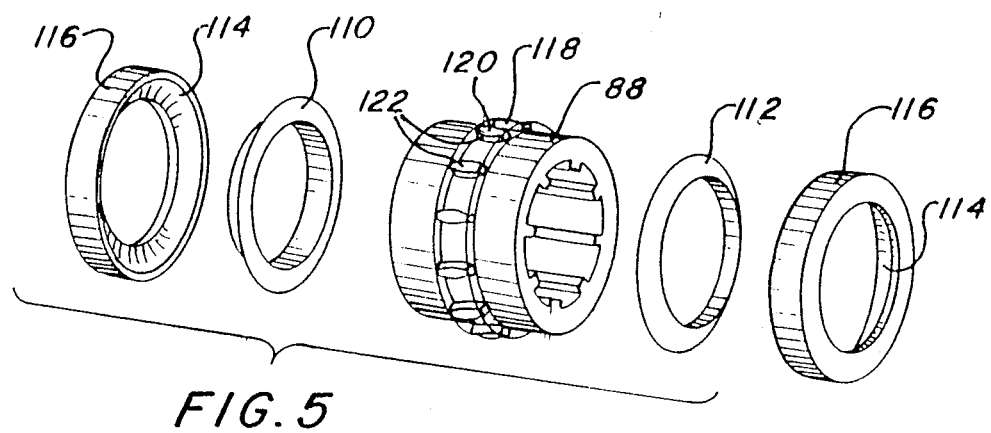

SIDE TRIMMER SHEAR

BACKGROUND OF THE INVENTION

1. Field of the Invention

This invention relates to apparatus which is used to remove the marginal edges from metallic sheet or strip material moving along a pass line. More particularly, the invention concerns such apparatus wherein, a knife head at each of opposite sides of the material includes shear knives and a drive element for rotating the knives while the knife heads are canted to operate while applying lateral tension on the sheet or strip without the requirement for a separate drive housing and universal drive shaft.

2. Description of the Prior Art

It is well known to those skilled in the art that in the production of sheet or strip material, whether of steel or other metal, where the material is moved through a pass line and ultimately turned into a product in the form of a coil or a stack of sheets, there is provided in association with the pass line a means for trimming the marginal edges of the material to a desired, predetermined width. Usually, the means further includes scrap-chopper means located adjacent to the shear-knife means and slightly downstream thereof for the obvious purpose of chopping the removed edges into small pieces.

It has been known, moreover, to mount the shear-knife means on shafts that extend toward the middle of the pass line and meet in a coupling. In known equipment of this kind, the drive shafts are coaxially located by rigid shaft and cannot be canted. This is done for speed matching of the shear knives at both sides of the strip. It is desirable that the shear-knife means tends to exert on the strip or sheet which is being cut a transverse force which tends to keep the sheet or strip flattened at the vicinity of the cut and prevent the material from becoming bunched. The traverse force will also cause the scrap trim edge to deflect thereby into a scrap chopper.

Known equipment of this kind possesses two main drawbacks. First, there is an impairment to the accessibility to the shear knives when they require maintenance such as sharpening, adjustment, or replacement. Second, the coupling means and drive shafts which are in the vicinity of the center of the pass line must be perfectly aligned. Despite the existence of these drawbacks over several decades, the art has not, prior to the present invention, developed to the point of having means whereby these disadvantages can be avoided or overcome.

SUMMARY OF THE INVENTION

Strip-trimming and scrap-chopping apparatus is provided wherein there is improved access to the shear knives and chopper elements. This is accomplished by having the shear knives and chopper elements mounted on relatively short shafts which are so journaled that they can be pivotally adjusted to vary the angle of attack upon the strip by the shear knives and chopper elements. The apparatus includes drive shafts which are coaxial, perpendicular to the pass line and connected by rigid coupling means, the drive shafts having splined portions to permit sheet-width adjustments. Gears riding the splined portions of the main drive shafts cooperate with gears on the shorter shafts bearing the shear knives or chopper elements. In comparison with prior-art equipment, there is improved accessibility to the shear knives for maintenance purposes and wherein there may be used, as a device connecting drive shafts in the vicinity of the center of the pass line, a coupling which is simpler in its construction, less costly, and longer in its service life.

The above and other objects and features of the invention will become apparent from the following detailed description taken in connection with the accompanying drawings which form a part of this specification and in which:

FIG. 4 is a cross-sectional view taken substantially along line IV—IV of FIG. 3; and FIG. 5 is a perspective view showing the spherical thrust bearing and gear drive interconnecting the trimmer and chopper drive shafts of the invention to the trimmer and chopper assemblies, respectively, while permitting pivotal movement of the latter assemblies with respect to the drive shafts.

Figure 1:
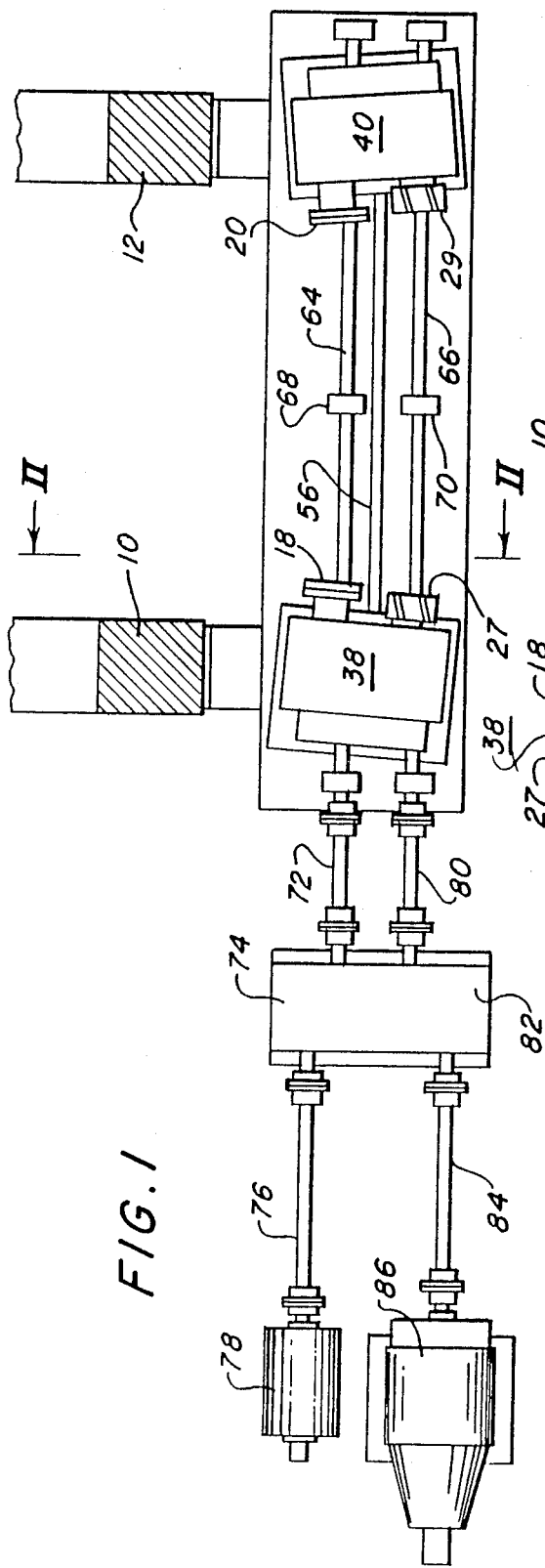
FIG. 1 is a top view of the side trimmer of the invention
Figure 2:
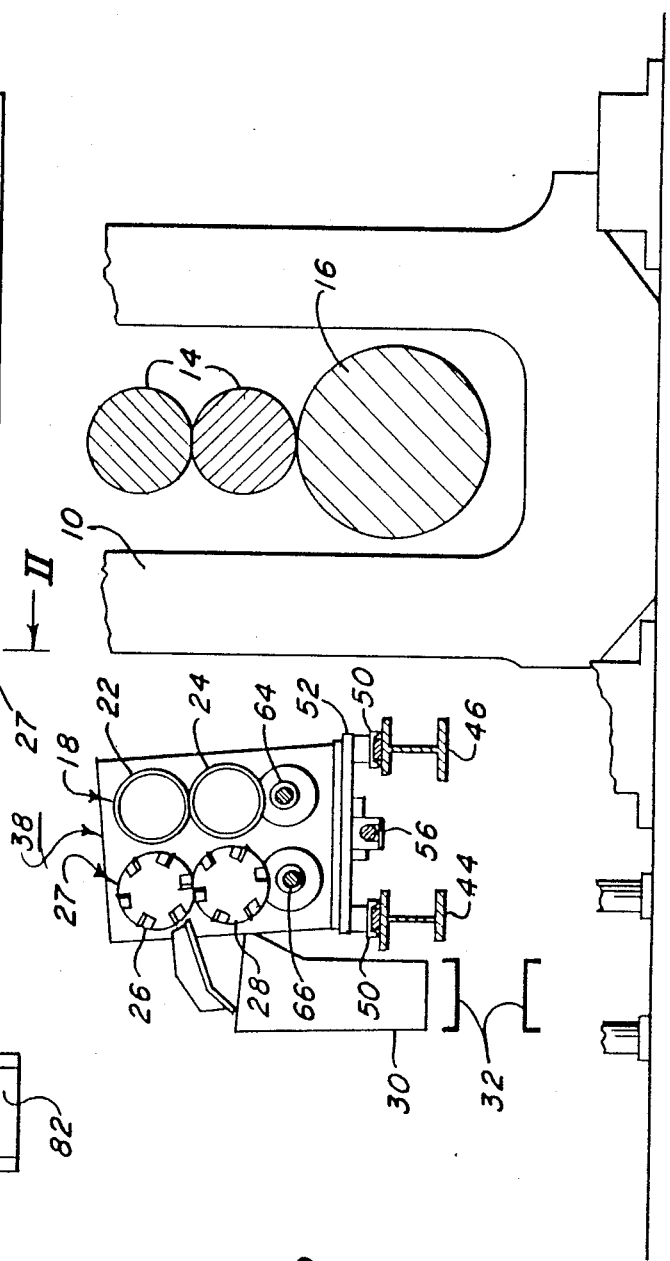
FIG. 2 is a sectional view of the side trimmer of the invention taken substantially along line II—II of FIG. 1.

With reference now to the drawings, and particularly to FIGS. 1 and 2, there is shown a rolling-mill housing comprising two upright stands 10 and 12 which support (FIG. 2) work rolls 14 and back-up rolls 16, only one backup roll being shown in FIG. 2.

Figure 3:
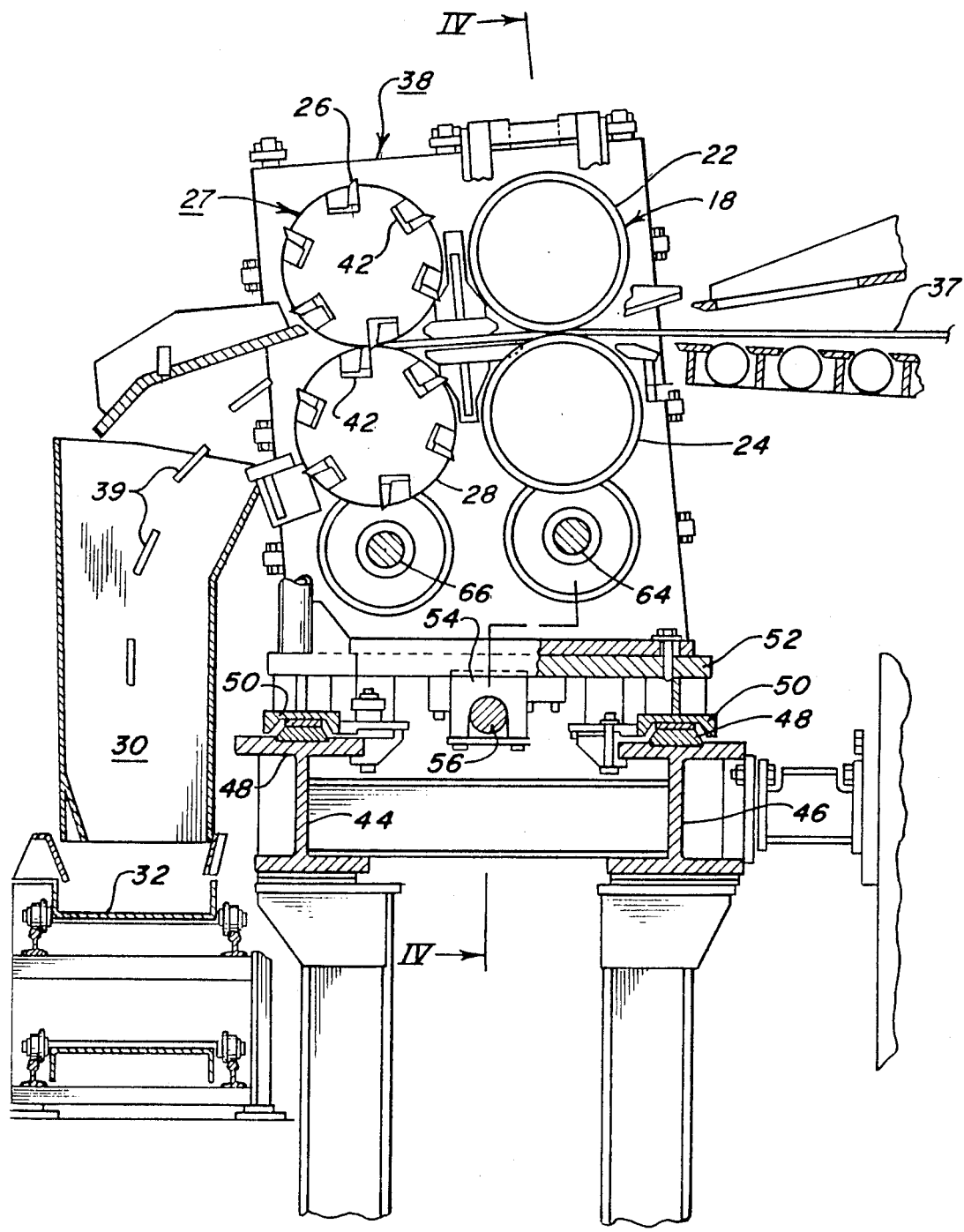
FIG. 3 is an enlarged view of the side trimmer as shown in FIG. 2.

In the rolling process, there are, of course, ragged edges on opposite sides of the strip material being rolled which must be removed. For this purpose, trimmer shear assemblies 18 and 20 are provided. As shown in FIGS. 2 and 3, each shear assembly comprises upper and lower shearing disks or knives 22 and 24 which abut each other at their lower and upper peripheral edges, respectively, (FIG. 4) such that the edge of strip material, in passing between the abutting edges of the shear knives 22 and 24, is sheared off. The sheared material then passes between the chopper rolls 26 and 28 of chopper roll assemblies 27 and 29. The chopper rolls 26 and 28 chop the material into small pieces which then fall through a scrap chute 30 and onto a scrap conveyor 32.

Shearing knife assembly 18 and, chopper roll assembly 27, are mounted on gear reducer 38; while shearing knife assembly 20 and chopper roll assembly 29 are mounted on gear reducer 40 as shown in FIG. 1. In FIG. 3, it can be seen that the strip material 37, after passing between the abutting edges of the shear knives 22 and 24 moves between the chopper rolls 26 and 28 where cooperating, protruding knife edges on inserts 42 in the peripheries of the rolls 26 and 28 sever the edge material into small pieces 39 which fall into the scrap chute 30 and onto the scrap conveyor 32.

As shown in FIG. 3, each gear reducer 38 or 40 is mounted on I-beams 44 and 46 which carry tracks 48 in their upper flanges. Slidable on the tracks 48 are U-shaped shoes 50 which depend downwardly from a plate 52 which is mounted on the gear reducer 38 or 40. Also carried on the bottom of the plate 52 is a block 54 having a central, threaded opening which receives a threaded drive shaft 56 (see also FIG. 1) which extends between the two gear reducers 38 and 40. The drive shaft 56 is connected through a gear reducer to a drive motor, not shown, the arrangement being such that upon rotation of the shaft 56, two gear reducers 38 and 40 can be moved toward or away from each other to accommodate strip material of differing widths.

The details of the gear reducers 38 and 40 are shown in FIG. 4. FIG. 4 is taken substantially along line IV—IV of FIG. 3 and shows the details of the drive mechanism for the shear knifes 22 and 24; however, it should be understood that the drive assembly for the chopper rolls 26 and 28 is essentially the same. The gear reducer itself is mounted on a plate 58 which, in turn, is pivotally connected by means of a pivot pin 60 to the plate 52 (also shown in FIG. 3) mounted on the shoes 50. The plate 58 and the gear reducer carried thereby may be adjusted about the axis of the pivot pin 60 and secured in a desired angular position by tightening bolts 62 which pass through accurate slots in the plate 58 and are threaded into the plate 52. In this manner, the shear knife assemblies can be angularly offset with respect to the pass line of the strip material passing through the rolling mill in order that they exert on the strip being rolled a transversely-extending force which tends to keep the sheet or strip flattened in the vicinity of the cut and prevent the material from becoming bunched or cobbled. As shown in FIG. 1, for example, the shear knife assemblies 18 and 20 are angled inwardly with respect to the direction of travel of the strip and will tend to exert a transverse pulling force on the strip to maintain it flat.

Referring again to FIG. 1, there extends between the two gear reducers 38 and 40 two rigid drive shafts 64 and 66 which rotate within bearings carried by pillow blocks 68 and 70. The drive shaft 64 drives the shear knife assemblies 18 and 20; while the drive shaft 66 drives the chopper roll assemblies 27 and 29. Shaft 64 is connected through the gear reducer 38 and shaft 72 to a gear reducer 74 which, in turn, connects the shafts 64 and 72 to shaft 76 and shear knife drive motor 78. In a similar manner, drive shaft 66 for the chopper roll assemblies 27 and 29 is connected through gear reducer 38, shaft 80, gear reducer 82 and a shaft 84 to a chopper roll drive motor 86. The end of the drive shaft 64 which extends through gear reducer 38 is shown in FIG. 4. It will be noted that the ends of the drive shaft 64, as well as the ends of drive shaft 66, are splined in order to permit movement of the gear reducers toward or away from each other in order to accommodate differing strip widths. This occurs upon rotation of the threaded drive shaft 56 (FIG. 3) as explained above.

The shaft 64 is connected through its splined end to a gear 88 mounted between spherical bearings 90 which permit rotation of the housing for gear reducer 38 about the axis of pivot pin 60 without disturbing the alignment of shaft 64 within the bearings in which it is carried. In this manner, the invention eliminates the need for a separate gear box while providing for canting of the knife heads.

Gear 88 meshes with internal gear teeth on a tubular gear 92 mounted in bearings 94. On the outer periphery of the tubular gear 92 are gear teeth 96 which mesh with a first pinion gear 98 mounted on a shaft 100 rotatable within bearings 102. Gear 98, in turn, meshes with a second gear 104 secured to a second shaft 106 mounted in bearings 108. The two shafts 100 and 106 protrude through the front face of the housing for gear reducer 38 in the example shown in FIG. 4 and, in turn, carry the respective shear knives 22 and 24.

The details of the gear 88 and the spherical bearing assemblies 90 are shown in FIG. 5. The assembly includes the gear 88 itself abutted on either side by beveled washers 110 and 112. The washers 110 and 112, in turn, are seated within concave surfaces 114 of backup rings 116 on either side of the gear 88. Gear 88 has teeth 118 with beveled upper surfaces 120 and curved side surfaces 122. As a consequence, the gear teeth 118 will transmit torque from the shaft 64 to the tubular gear 92. At the same time, it will permit the shaft 64 to be misaligned with respect to the tubular gear 92. In this manner, the entire gear reducer 38 can be pivoted about pivot pin 60 to produce the angular relationship shown in FIG. 1 for example, without disturbing the alignment of drive shafts 64 and 66.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A side trimmer for metallic strip travelling along a pass line comprising gear housings on opposite sides of the strip as it passes along the pass line, means for varying angular positions of said gear housings with respect to said pass line, upper and lower shear knives carried on said gear housings for engaging and trimming opposed edges of said strip, a rigid drive shaft extending from one of said gear housings to the other one of said gear housings and carried within aligned bearings, gears carried on said drive shaft within the respective housings and having gear teeth with curved sidewalls to permit angular variation of the positions of the gear housings with respect to the said pass line without disturbing the alignment of said rigid drive shaft within its bearings, and gearing within said housings connecting said gears with curved sidewall gear teeth to said shear knives.

2. The side trimmer of claim 1 including upper and lower chopper rolls carried by said gear housings at points beyond the shear knives along the pass line of the strip material, a second rigid drive shaft extending between said gear housings and carried within aligned bearings, gearing within said gear housings for driving said chopper rolls, and a second gear carried on said second drive shaft and having gear teeth with curved sidewalls to permit angular variation on the positions of the gear housings with respect to said pass line without disturbing the alignment of said second rigid drive shaft within its bearings.

3. The side trimmer of claim 1 including means for facilitating movement of said gear housings toward or away from each other to accommodate strip of differing widths.

4. The side trimmer of claim 1 wherein said gears are connected through splines to said drive shaft and are mounted between spherical bearings to permit pivotal movement of the gear housings with respect to the pass line of strip material without disturbing alignment of said drive shaft.

* * * * *